Inventor:
ELDON C. CORNISH
BY John V. Regan
Attorney

Inventor:
ELDON C. CORNISH
BY John V. Regan
Attorney

United States Patent Office 3,412,265
Patented Nov. 19, 1968

3,412,265

HIGH SPEED DIGITAL TRANSFER CIRCUITS FOR BISTABLE ELEMENTS INCLUDING NEGATIVE RESISTANCE DEVICES

Eldon C. Cornish, Pennsauken, N.J., assignor to Radio Corporation of America, a corporation of Delaware Filed Nov. 24, 1965, Ser. No. 509,484
6 Claims. (Cl. 307—247)

ABSTRACT OF THE DISCLOSURE

High speed digital transfer circuit for bistable elements including negative resistance devices, such as tunnel diodes. The transfer circuit includes a first current mode switch and a control means for controlling the state of the tunnel diode in response to unipolar clock pulses. In one disclosed circuit, the control means includes a transistor having its collector emitter path connected between the tunnel diode and the current mode switch. The clock pulses are applied to the base of the transistor. In another disclosed circuit, the control means includes a second current mode switch for inhibiting the steering of the current to one of the current paths of the first current mode switch during the absence of the clock pulses. A charge storage device is also provided for placing the tunnel diode in one of its stable states.

This invention relates to high speed digital circuitry useful, for example, in data processing, in high resolution radar and in pulse-modulated communication systems. In particular, the invention relates to a bistable circuit element and digital transfer circuit which are embodied in a shifting arrangement characterized by small size, high speed operation and low power dissipation.

A known type of high speed shifting arrangement includes as a bistable circuit element, a tunnel diode and a current mode switch. One scheme for transferring digital signals to the bistable circuit employs positive and negative clock pulses for setting and resetting the tunnel diode. This scheme is undesirable in certain applications because it is difficult to generate and distribute the positive and negative clock pulses at the proper times during the duty cycle. Moreover, the shifting operation is relatively slow due to the need for bipolar clock pulses, and serious race conditions are likely to occur.

A prior art unipolar clock pulse scheme for setting and resetting the tunnel diode includes a further tunnel diode, the two tunnel diodes forming a so called "locked pair". In applications requiring high speed and low power dissipation, it is desirable that the peak currents of the tunnel diodes be accurate. Consequently, close tolerances resulting in high costs are placed on the tunnel diodes.

An object of this invention is to provide an improved high speed and low power digital circuit.

Another object of this invention is to provide improved high speed digital circuitry which is compact and inexpensive.

A further object of this invention is to provide an improved digital shifting circuit which requires only one tunnel diode per stage and a single unipolar shift pulse.

Briefly stated, the present invention includes a bistable element, a digital signal means, and a transfer circuit for transferring the digital signals to the bistable element. The transfer circuit includes a current mode switch having first and second current paths to which current is steered to one or the other, depending upon whether the digital signal to be transferred is a binary "1" or a "0." A control means responds to the presence and absence of current in one of the current paths in order to place the bistable element in a stable state which corresponds to the digital signal being transferred. A clock means generates clock pulses for activating the control means.

In one embodiment of the invention, the control means includes an amplifying device having two of its electrodes connected between the current mode switch and the bistable element. The clock pulses are applied to a third electrode of the amplifying device. In another embodiment of the invention, the control means includes another current mode switch for inhibiting the steering of current to one of the current paths during the absence of the clock pulses. A charge storage device is also provided for placing the bistable element in one of its stable states.

In the accompanying drawing, like reference characters denote like components, and:

Figure 1:
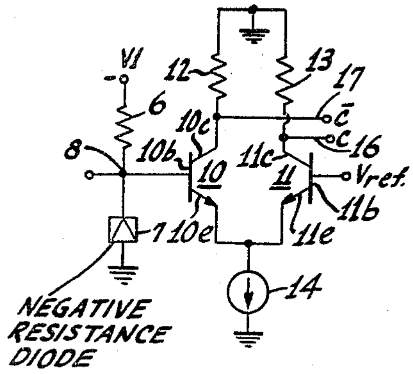
FIG. 1 is a schematic diagram of a known bistable circuit element.

The bistable circuit element in FIG. 1 includes a pair of transistors 10 and 11 which have their emitter electrodes **10*e* and 11*e* connected in common to one terminal of a substantially constant current source 14. The other terminal of source 14 is connected to a point of reference potential, indicated by the conventional symbol for circuit ground. The collector electrodes 10*c* and 11*c* are connected by way of separate resistances 12 and 13 to circuit ground. The collector electrodes 11*c* and 10*c* are also connected to output terminals 16 and 17 at which output signals C and $\overline{C}$ are developed. The base electrode 11*b* is connected to a fixed reference voltage supply designated $V_{ref}$. The base electrode 10*b* is connected to a circuit junction 8** to which digital signals are applied.

Figure 2:
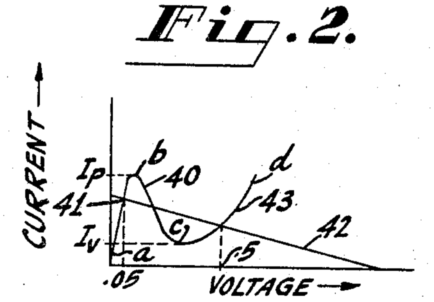
FIG. 2 is a graph of the current-voltage characteristic of a negative resistance diode employed in the bistable element of FIG. 1.

A negative resistance diode 7 has its cathode connected to the circuit junction 8 and its anode connected to circuit ground. The negative resistance diode 7 is preferably a tunnel diode having a current-voltage characteristic as illustrated by curve 40 in the graph of FIG. 2. In FIG. 2 the voltage V applied to the tunnel diode is plotted along the abscissa and the resulting current I is plotted along the ordinate. First and second regions of the curve between the points *ab* and *cd* are regions of positive resistance at relatively low and high values of voltage, respectively. The region between the points *b* and *c* is one of negative resistance.

A bias circuit for the tunnel diode includes a load resistance 6 connected between circuit junction 8 and the negative terminal of a bias voltage VI, of which the positive terminal (not shown) is grounded. In FIG. 2, a load line 42 passes through stable operating points 41 and 43 in the positive regions *ab* and *cd*. The load line 42 also intersects the negative resistance region of the tunnel diode. This latter intersection is a point of unstable operation and the tunnel diode will switch to one of the two stable operating points 41 or 43. The current supplied to the tunnel diode by the bias circuit has a value less than the peak current $I_p$ at point 41 and greater than the valley current $I_v$ at point 43. For one type of tunnel diode, the intersection 41 has a value of about 0.05 volt and the point 43 has a value of about 0.5 volt. Accordingly, these two operating points 41 and 43 are termed "low" and "high" states of the diode. These "high" and "low" states of the tunnel diode are considered to be indicative of the two binary digits "1" and "0," respectively.

The bistable circuit element operates as follows. Consider that the reference supply voltage $V_{ref}$ has a value which is midway between the voltage levels of the stable states of the tunnel diode and has a polarity which corresponds to the polarity of the diode 7. For a tunnel diode having a characteristic as illustrated in FIG. 2, $V_{ref}$ has a value of −0.25 volt. When the tunnel diode is in its higher or binary "1" state, the circuit junction 8 has a voltage level of −0.5 volt. The base electrode 11*b* is more positive than the base electrode 10*b* so that transistor 11 is conducting and transistor 10 is cut off. Current is steered through resistance 13 and the collector-to-emitter path of transistor 11 to the current source 14. If the resistance 13 is selected to have an appropriate value, the output signal C is at the binary "1" voltage level of −0.5 volt. Since no curent is flowing in resistance 12, the complementary output signal $\overline{C}$ is at 0 volt. When the tunnel diode 7 is in its low or binary "0" state, the circuit junction 8 is at the binary "0" voltage level of about 0 volt. For this condition, the base electrode 10*b* is more positive than the base electrode 11*b* so that transistor 10 is conducting and transistor 11 is cut off. Current is now steered from circuit ground through resistance 12 and the collector-to-emitter path of transistor 10 to the current source 14. If the resistance 12 is selected to have an appropriate value, the output signal $\overline{C}$ is at the binary "1" voltage level of −0.5 volt. The output signal C is at 0 volt for this condition.

The bistable circuit element is switched between its stable states by the application of suitable signals to the circuit junction 8. In the usual type application, these switching signals are developed in response to a command shift or clock pulse to transfer digital signals to the bistable element from a digital signal source, such as another like bistable element. The present invention provides a digital transfer circuit arrangement which requires only one clock or shift pulse and which requires no additional tunnel diodes.

Figure 3:
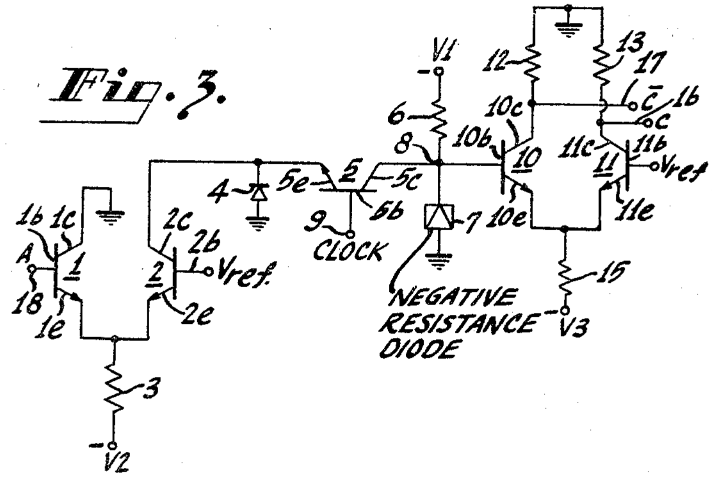
FIG. 3 is a schematic diagram of one embodiment of a digital circuit according to the present invention.

In the embodiment of FIG. 3 the digital circuitry includes a bistable element which is substantially like the FIG. 1 circuit except that the substantially constant current source is illustrated by a resistor 15 connected to the negative electrode of a bias supply V3 having its positive terminal (not shown) connected to circuit ground. This type of current source is selected for ease of illustration and it is understood that other types can be used.

The digital transfer circuitry includes a pair of transistors 1 and 2 connected for operation as a current mode switch. To this end, the emitter electrodes 1*e* and 2*e* are connected by way of common emitter resistor 3 to the negative terminal of a bias supply voltage V2 having its positive terminal (not shown) connected to circuit ground. Together the resistance 3 and the bias supply V2 function as a source of substantially constant current for the current mode switch. The base electrode 2*b* is connected to a fixed reference voltage supply designated $V_{ref}$. The base electrode 1*b* is connected to an input terminal 18 to which a digital signal A is applied for transfer to the bistable circuit element.

The collector electrode 1*c* is connected to circuit ground. The collector electrode 2*c* is connected to the emitter electrode 5*e* of a transistor 5. The emitter electrode 5*e* is also connected to the cathode of a clamp diode 4 which has its anode connected to circuit ground. The collector electrode 5*c* is connected to the circuit junction 8. The base electrode 5*b* is connected to a terminal 9 to receive clock or shift pulses. These clock or shift pulses may vary between −0.2 volt and +0.5 volt.

The digital signal A to be transferred may be derived from one of the complementary outputs of another bistable element, which for the purpose of the following description is considered to be a preceding stage of a shifting circuit. Assume therefore that the digital signal levels are 0 volt and −0.5 volt, indicative of binary "0" and "1," respectively. Assume also that the reference voltage supply $V_{ref}$ has a value of −0.25 volt midway between the digital voltage swing. Thus, the reference supply voltage at each of the two base electrodes 2*b* and 11*b* can be derived from a single supply source. This single supply could be any one of the bias supplies V1 or V2 or V3. Alternatively, the bias supplies V1, V2 and V3 could be one common bias supply. In any case, assume that each of the supplies V1, V2 and V3 has a value of −2 volts for the purpose of the following description.

Consider now the operation of the overall circuit of FIG. 3 and assume at time $t_1$ (FIG. 4) the clock pulse voltage is −0.2 volt and that tunnel diode 7 is in the low or binary 0 voltage state. As previously described, the output signals C and $\overline{C}$ are at the binary "0" and binary "1" voltage levels, respectively.

Also, at time $t_1$ the digital signal A is at the binary "1" level of about −0.5 volt. For this condition the base electrode 1*b* is more negative than the base electrode 2*b* so that transistor 2 is conducting and transistor 1 is nonconducting. Current flows from circuit ground through the diode 4, the collector-to-emitter path of transistor 2 and resistor 3 to the negative terminal of the bias supply V2. The diode 4 functions to clamp the collector electrode 2*c* to a voltage which is more negative than circuit ground by the amount of voltage drop across the diode. For a silicon type diode the collector 2*c* is clamped to about −0.7 volt.

With the clock pulse voltage at −0.2 volt, gating transistor 5 is biased into nonconduction. At time $t_2$ the clock pulse voltage rises to +0.5 volt biasing the transistor 5 into conduction. After a short delay occasioned by the turn-on time of the transistor 5, at about time $t_3$ a large transient current flows from circuit ground through the tunnel diode 7 and to the collector electrode 5*c*. This transient current exceeds the peak current $I_p$ of the tunnel diode so that the tunnel diode rapidly switches (less than a nanosecond) to its high or binary "1" state. After the tunnel diode is switched the clock pulse returns to the −0.2 volt level. The voltage at base electrode 10*b* falls to −0.5 volt after the tunnel diode 7 switches. As previously described for this condition, the C and $\overline{C}$ output voltage levels change to the binary "1" and "0" levels, respectively. As may be seen in FIG. 4, the C and $\overline{C}$ output signals do not change immediately upon the switching of the tunnel diode 7. There is a delay from time $t_3$ to $t_4$ which is occasioned by the turn-off delay time of the transistor 10 and the turn-on delay time of the transistor 11.

This switching time delay of the transistors 10 and 11 is advantageous in a shifting circuit application. As mentioned previously, at or about time $t_3$ the clock pulse voltage falls to the −0.5 voltage level, whereby transistor 5 is biased into nonconduction to isolate the bistable circuit element from the input signal A. Since the input A is connected to one of the complementary outputs of the preceding stage, it is apparent that the input signal condition does not change until sometime after $t_3$ due to the delay in the output voltage change of the preceding stage. In like manner, one of the output signals C and $\overline{C}$ may be coupled to an input of another like digital circuit in a succeeding stage. Since any voltage change of the output signals C and $\overline{C}$ is delayed following the termination of the clock pulse, the gating transistor in the succeeding stage isolates the bistable circuit element of the succeeding stage from the changes in signal condition at its input. Essentially the delay between the switching of the tunnel diode 7 and any change in voltage of the output signals C and $\overline{C}$ may take the place of the interim stage or delay generally provided in many shifting type circuits. The actual delay $t_3$ to $t_4$ may be about 2 to 4 nanoseconds, depending upon circuit loading.

Figure 4:
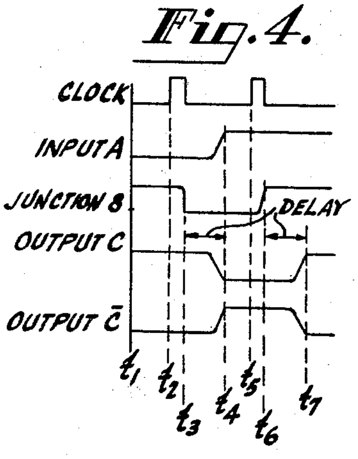
FIG. 4 is a set of voltage waveforms appearing at selected points in the FIG. 3 circuit.

If the input signal A remains at the binary "1" voltage level of −0.5 volt, the application of succeeding clock pulses to the terminal 9 does not change or switch the tunnel diode 7 from its high or binary "1" state. However, consider that the input signal A does change from the binary "1" to the binary "0" level at time $t_4$ (FIG. 4).

The voltage at the base electrode 1$b$ rises to about 0 volt. Since this base voltage is more positive than the voltage (−0.25 volt) at the base electrode 2$b$, the transistor 1 is biased into conduction and the transistor 2 is cut off. Current now flows from circuit ground through the collector-to-emitter path of transistor 1 and through the resistance 3 to the negative terminal of the bias supply V2.

At time $t_5$ the clock pulse voltage rises to +0.5 volt. Due to the nonconduction of transistor 2 the clock pulse does not forward bias the base-to-emitter junction of the transistor 5. However, the collector electrode 5$c$ is at a voltage of −0.5 volt since the tunnel diode is in the high or binary "1" state. These voltage conditions at the base and collector electrodes of the transistor 5 forward bias the base-to-collector junction, whereby a transient reverse current flows from the terminal 9 through the base-to-collector junction of transistor 5 and through the tunnel diode 7 to circuit ground. The tunnel diode rapidly switches back to its low or binary "0" state at time $t_6$. After the tunnel diode is switched, the clock pulse returns to the −0.2 volt level. The voltage at base electrode 10$b$ rises to about 0 volt. The base 10$b$ voltage then is more positive than the voltage at the base electrode 11$b$, whereby the transistor 10 turns on and the transistor 11 turns off. All the current now flows in the current path which includes the collector and emitter electrodes of transistor 10. The C and $\overline{C}$ output voltage levels change to the binary "0" and "1" levels, respectively. Again, there is a delay from time $t_6$ to $t_7$ which is occasioned by the turn-on and turn-off times of the transistors 10 and 11. So long as the input signal A remains at the binary "0" level, succeeding clock pulses do not disturb the state of the bistable circuit. Thus, the transfer circuit transfers binary "1" and "0" signals from the input terminal 8 to the bistable circuit element in response to a single unipolar clock pulse.

Figure 5:
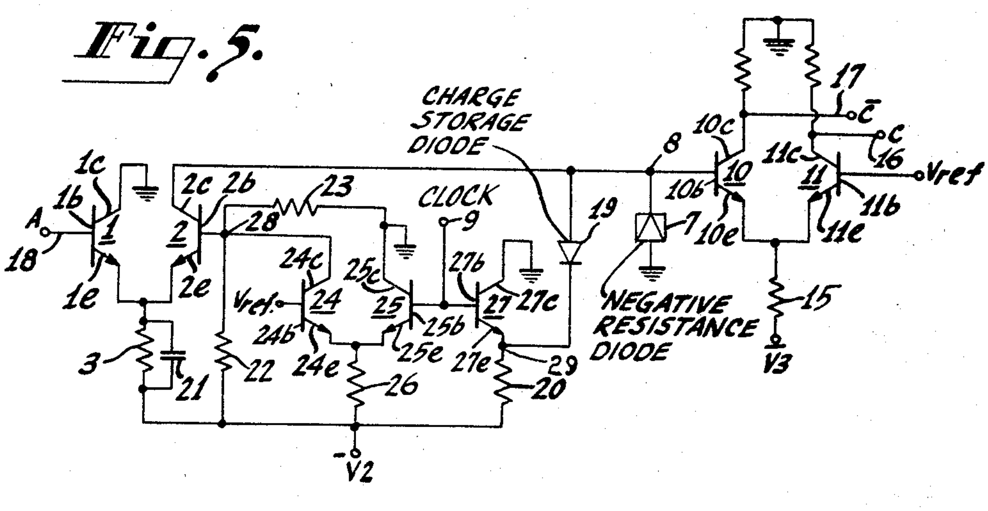
FIG. 5 is a schematic diagram of another embodiment of a digital circuit according to the present invention.

In a further embodiment illustrated in FIG. 5 the digital circuitry includes a bistable circuit element which is substantially like the bistable circuit element in FIGS. 1 and 3 except that there is a different bias circuit for the tunnel diode 7. Bias for the tunnel diode 7 is provided by way of a charge storage diode 19 having its anode connected to the circuit junction 8 and its cathode connected to a circuit junction 29. The circuit junction 29 is connected by way of resistance 20 to the negative terminal of the bias supply V2.

Charge storage diodes are well known in the art. Briefly, storage diodes possess the same high conductivity properties as ordinary semiconductor diodes when biased for conduction in the forward direction; that is, with the anode more positive than the cathode by an amount equal to the threshold of the diode. The threshold for a silicon type storage diode, for example, is about 0.7 volt. If, after a period of forward conduction, the bias applied to the storage diode becomes inadequate to sustain forward conduction, the storage diode is unlike the ordinary semiconductor diode in that it exhibits high conductivity in the reverse direction for a period of time that may be called the storage period or recovery time.

The digital transfer circuit includes a pair of transistors 1 and 2 interconnected in the same way as in the embodiment of FIG. 3 with the following exceptions: namely, a capacitor 21 is connected across the common emitter resistance 3; the collector electrode 2$c$ is directly connected to the circuit junction 8; and the base electrode 2$b$ is connected to a circuit junction 28.

The circuit junction 28 is connected by way of resistance 23 to circuit ground and by way of resistance 22 to the negative terminal of the bias supply voltage V2. The resistances 22 and 23 provide a voltage divider arrangement.

The circuit junction 28 is further connected to the collector electrode 24$c$ of a transistor 24. The transistor 24 is interconnected with another transistor 25 for operation as a current mode switch. To this end the base electrode 24$b$ is connected to a reference supply voltage $V_{ref}$, which may be the same reference supply voltage applied to the base electrode 11$b$ of the bistable circuit element. The emitter electrodes 24$e$ and 25$e$ are connected by way of a common emitter resistance 26 to the negative terminal of the bias supply voltage V2. The collector electrode 25$c$ is connected to circuit ground. The base electrode 25$b$ is connected to a terminal 9 to which clock signals are applied. The clock signal terminal 9 is connected to the base electrode 27$b$ of a transistor 27 having its emitter electrode 27$e$ connected to the circuit junction 29. The collector electrode 27$c$ is connected to ground. Like the embodiment of FIG. 3 the digital signal A may have either the voltage level of 0 volt or −0.5 volt indicative of binary "0" and "1," respectively. For this choice of digital signal swing, the reference voltage supply $V_{ref}$ is selected to have a value of −0.25 volt. This reference supply voltage can be derived from the bias supply V3 by means of a suitable divider arrangement. In addition, the bias supplies V2 and V3 could be one common bias supply. In any event, assume that each of the supplies V2 and V3 has a value of −2.0 volts for the purpose of the following description. Assume also that the values of resistances 22 and 23 are such that the circuit junction 28 is at a voltage level of −0.25 volt when transistor 24 is not conducting.

Consider now the operation of the overall circuit of FIG. 5 and assume that at time $t_1$ (FIG. 6) the clock pulse voltage is at −0.5 volt and that tunnel diode 7 is in the low or binary "0" voltage state. As previously described for this condition, the output signals C and $\overline{C}$ are at the binary "0" and binary "1" voltage levels, respectively.

With the clock pulse voltage at −0.5 volt, the base electrode 24$b$ is more positive than the base electrode 25$b$ whereby transistor 24 is conducting and transistor 25 is nonconducting. Current flows from circuit ground through resistor 23, circuit junction 28, the collector-to-emitter path of transistor 24 and common emitter resistor 26 to the negative terminal of the bias supply V2. This current flow establishes a voltage level of −0.65 volt at circuit junction 28. This voltage level is more negative than either of the digital voltage levels of input signal A so that the transistor 2 is nonconducting regardless of the level of the input signal A. Since the base electrode 2$b$ is more negative than the base electrode 1$b$, transistor 1 is conducting and transistor 2 is nonconducting. All of the current flows from circuit ground through the collector-to-emitter path of transistor 1 and through resistance 3 to the negative terminal of the bias supply V2.

At time $t_2$ the clock pulse voltage rises to 0 volt. Base electrode 25$b$ is now more positive than the base electrode 24$b$, whereby transistor 25 becomes conducting and transistor 24 becomes nonconducting. The voltage level at the circuit junction 28 rises to −0.25 volt after a slight delay occasioned by the turn-on and turn-off of transistors 25 and 24, respectively. With the circuit junction 28 at −0.25 volt and the input digital signal A at −0.5 volt, the transistor 2 becomes conducting and the transistor 1 becomes nonconducting. As the transistor 2 begins to turn on, a large transient current flows from circuit ground through the tunnel diode 7, collector-to-emitter path of transistor 2 and the low impedance path of the capacitor 21 to the negative electrode of the bias supply V2. The tunnel diode rapidly switches (less than a nanosecond) at about time $t_3$. At or about this time, the clock pulse voltage returns to the −0.5 volt level. The voltage at base electrode 10*b* falls to −0.5 volt after the tunnel diode 7 switches. For this condition, the C and $\overline{C}$ output voltage levels change to the binary "1" and "0" levels, respectively. Like the embodiment of FIG. 3 the C and $\overline{C}$ output signals do not change immediately upon the switching of the tunnel diode 7. There is a delay from time $t_3$ to $t_4$ which is occasioned by the turn-off delay time of the transistor 10 and the turn-on delay time of the transistor 11.

As in the FIG. 3 embodiment, this switching time delay is advantageous in shifting circuit applications. When the clock pulse voltage is at −0.5 volt, the circuit junction 28 is at −0.65 volt, thereby holding transistor 2 off regardless of the voltage level of the digital signal A. Since the input signal A is connected to one of the complementary outputs of the preceding stage, it is apparent that the input signal A does not change until time $t_4$ due to the delay in the output voltage change of the preceding stage.

If at time $t_4$ the voltage level at circuit junction 28 does not return to the −0.65 voltage level by the current mode transistors 24 and 25, a "race" condition would exist. To prevent this condition, a resistance (not shown) of suitable value can be inserted between circuit junction 8 and base electrode 10*b* in each stage of the shifting circuit. This resistance and the input capacitance of the transistor 10 would effectively increase the delay time from time $t_3$ to $t_4$.

If the input signal A remains at the binary "1" voltage level of −0.5 volt, the application of succeeding clock pulses to the terminal 9 does not change or switch the tunnel diode 7 from its high or binary "1" state.

Figure 6:
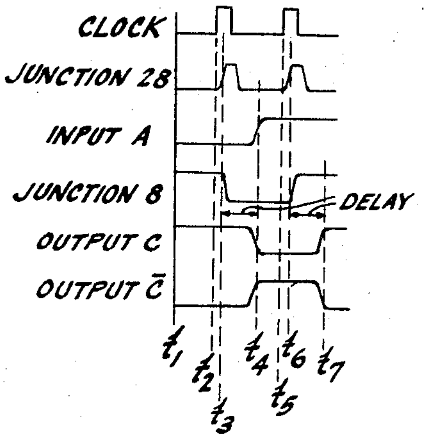
FIG. 6 is a set of voltage waveforms appearing at selected points in the FIG. 5 circuit.

Consider now that the input signal A does change from the binary "1" to the binary "0" level at time $t_4$ (FIG. 6). The voltage at the base electrode 1*b* rises to about 0 volt. At time $t_5$, the clock pulse voltage rises to about 0 volt. Base electrode 25*b* is now more positive than the base electrode 24*b*, whereby transistor 25 becomes conducting and transistor 24 becomes nonconducting. The voltage level at circuit junction 28 rises to −0.25 volt at about time $t_6$. With the circuit junction 28 at −0.25 volt and the input digital signal A at 0 volt, the transistor 1 remains conducting and the transistor 2 remains nonconducting.

Also at time $t_5$, the rising clock pulse voltage is coupled by way of the base-emitter junction of transistor 27 to the circuit point 29. Assuming the transistor 27 is a silicon type, the voltage level at the circuit junction 29 rises to about −0.7. With the circuit junction 8 at a voltage level of −0.5 volt, the storage diode 19 is no longer biased for conduction in the forward direction. Due to the accumulation of storage charged during the preceding period of forward conduction, a reverse current now flows to rapidly switch the tunnel diode 7 to its low or binary "0" state at about time $t_6$. After the tunnel diode 7 is switched, the clock pulse returns to the −0.5 volt level. For this binary "0" state of the tunnel diode, the C and $\overline{C}$ output voltage levels change to the binary "0" and "1" levels, respectively. Again, there is a delay from time $t_6$ to $t_7$ which is occasioned by the turn-on and turn-off times of the transistors 10 and 11. So long as the input signal A remains at the binary "0" level, succeeding clock pulses do not disturb the state of the bistable circuit. Thus, the transfer circuit transfers binary "1" and "0" signals from the input terminal 18 to the bistable circuit element in response to a single unipolar clock pulse.

An advantage of the FIG. 5 circuit is that the resistors 22 and 23 can control the voltage at the circuit junction 28 independently of temperature drift when they are fabricated in the same wafer of semiconductor material. This is so since the ratio of the resistance values of the two resistors remains constant despite temperature variations.

The circuits of the invention can be arranged to perform logical operations on a plurality of input signals. The logic circuit of FIG. 7 includes the circuit described in connection with FIG. 3 with additional transistors 30, 1′, 2′ and 30′ and a resistance 3′. The transistor 30 has its collector electrode 30*c* connected to circuit ground and its emitter electrode 30*e* connected by way of common emitter resistance 3 to the negative terminal of the bias supply V2. Base electrode 30*b* is connected to an input terminal 31 to which an input signal D is applied.

The transistors 1′, 2′ and 30′ and the resistance 3′ are connected in a current mode circuit configuration which is substantially identical to the circuit configuration of the transistors 1, 2 and 30 and the resistance 3. To this end the base electrodes 2*b* and 2*b′* share a common reference voltage supply $V_{ref}$. In addition, the resistances 3 and 3′ are connected in common to the negative terminal of the bias supply V2. The base electrodes 1*b′* and 30*b′* are connected to input terminals 18′ and 31′, respectively, to which input signals E and B are applied.

Figure 7:
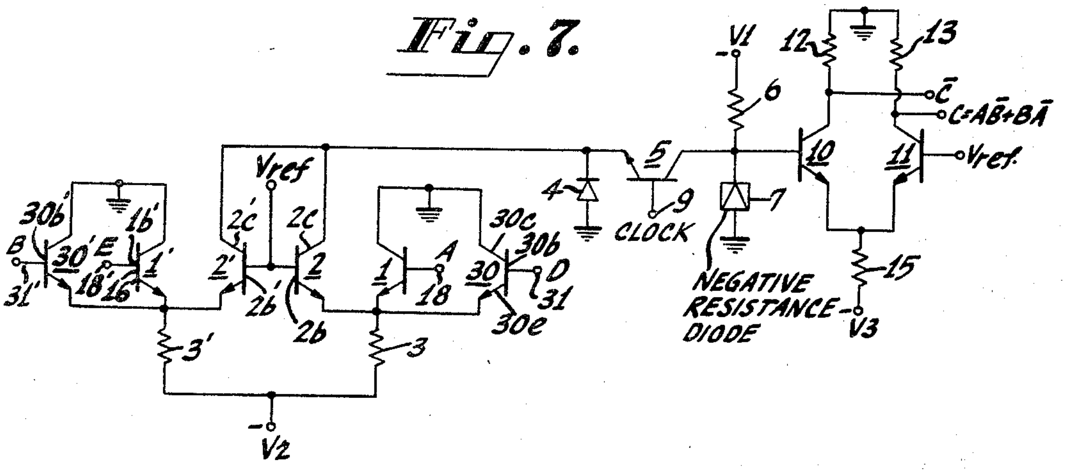
FIG. 7 is a schematic diagram of the FIG. 3 circuit connected for performing logical operations.

As previously described in connection with FIG. 3, the output signal C of the bistable circuit element switches to or remains at the binary "1" level only if the transistor 2 is conducting when a clock pulse is applied to the clock terminal 9. Since the transistor 2′ is connected in substantially the same way as transistor 2, the output signal C also responds similarly to the transistor 2′. In FIG. 7, transistor 2 can turn on only if both input signals A and D are at the binary "1" voltage level of −0.5 volt. Likewise, the transistor 2′ is conducting only if both input signals B and E are binary "1's." Thus, the output signal C is a binary "1" when the input signals A and D are binary "1's" or when the input signals B and E are binary "1's."

This function is generally known as an AND/OR function and can be expressed in Boolean form as follows:

$$C=AD+BE$$

If the input variables D and E are the complements of input variables B and A, respectively, the above equation becomes:

$$C=A\overline{B}+B\overline{A}$$

which is the special case of the EXCLUSIVE-OR function.

It is apparent that the embodiment of FIG. 5 can be similarly modified to perform the above logical functions. For instance, the base electrodes 2*b* and 2*b′* would be connected in common to the circuit junction 28. In addition, a capacitor, similar to capacitor 21 would be connected across the resistance 3′.

Figure 8:
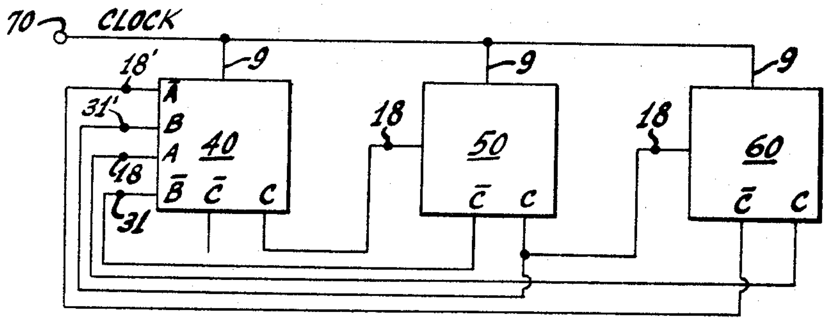
FIG. 8 is a block diagram of three stages of a shifting circuit in which the embodiments of FIGS. 3 or 5 are useful.

By way of illustration only, the embodiments of either FIGS. 3 or 5 are shown in FIG. 8 connected in a particular type of shifting circuit known as a sequence generator. By way of example, the first stage 40 may include the embodiment as illustrated in FIG. 7 and the second stage 50 and third stage 60 may include the embodiment of FIG. 3. The output signal C and $\overline{C}$ of the third stage 60 are applied to input terminals 18 and 18′ of the first stage 40 as input signals A and $\overline{A}$. The output signal C and $\overline{C}$ of the second stage 50 are applied to the input terminals 31 and 31′ of the first stage 40 as input signals B and $\overline{B}$. The C output signal of the first stage 40 is applied to input terminal 18 of the second stage 50; and the C output signal of the second stage 50 is further applied to the input terminal 18 of the third stage 60. The clock terminals 9 of each stage are connected in common to a signal clock terminal 70.

In operation, assume that the C output signals of the stages 40, 50 and 60 are "1," "0" and "0," respectively. The first clock pulse shifts the binary "1" of the first stage 40 into the second stage 50 and the "0" of the second stage 50 into the third stage 60. Since both input signals A and B to the first stage 40 are "0's," the first stage 40 changes to the "0" state. The states of the first, second and third stages are now "0," "1" and "0," respectively.

The next clock pulse, shifts the "0" of the first stage 40 into the second stage 50 and the "1" of the second stage 50 into the third stage 60. Since the B input signal at input terminal 31' is a "1" and the $\overline{A}$ signal at input terminal 18' is a "1," the first stage 40 now changes to the "1" state. The states of the first, second and third stages are now "1," "0" and "1," respectively.

Succeeding clock pulses shift the "1's" and "0's" in a similar manner to generate a particular sequence of "1's" and "0's." It is apparent that the shifting circuit can include any desired number of stages with any desired number of EXCLUSIVE-OR stages depending upon the particular pattern of "1's" and "0's" desired. Moreover, it is apparent that the shifting circuit need not include EXCLUSIVE-OR stages.

Two embodiments of digital circuitry useful in shifting circuits have been described. When it is desired to fabricate the embodiment of FIG. 5 as an integrated circuit, it may be desirable to substitute for the charge storage diode 19 a transistor having its collector and emitter electrodes directly connected together. If the transistor is an NPN type, the base electrode is analogous to the anode; and the directly connected collector and emitter electrodes are analogous to the cathode of the charge storage diode.

Although the invention has been illustrated with transistors of the NPN type, it is apparent that transistors of the PNP type can be used so long as the polarities of the diodes and the bias supplies are appropriately charged. Moreover, it should be apparent that the assignment of the binary "1" and "0" symbols to the low and high digital voltage levels is arbitrary. The high and low digital voltage levels can just as well be indicative of binary "1" and "0," respectively.

What is claimed is:

1. A digital circuit comprising:
a bistable element which includes a negative resistance device,
digital signal means adapted to provide bilevel digital signals,
clock means adapted to provide clock pulses,
a transfer circuit for transferring said digital signals from said digital signal means to said bistable element, said transfer circuit including,
current means adapted to provide a substantially constant current,
a first current mode switch having an input connected to said digital signal means, said current mode switch having a first current path to which said constant current is steered when said digital signals are at one of said levels and a second current path to which said constant current is steered when said digital signals are at the other of said levels, and
control means including an amplifying device having first, second and third electrodes, said first electrode being connected to said second current path, said second electrode being connected to the negative resistance device of said bistable element, and said third electrode being connected to said clock means.

2. A digital circuit according to claim 1
wherein said amplifying device is a transistor having emitter, collector and base electrodes corresponding to said first, second and third electrodes, respectively, and
wherein a diode clamp is connected to said emitter electrode.

3. A digital circuit according to claim 2
wherein said current mode switch includes first and second transistors, each having an emitter and a collector electrode to define said first and second current paths, and
wherein said negative resistance device is a tunnel diode.

4. The combination comprising:
a bistable element which includes a negative resistance device,
digital signal means adapted to provide bilevel digital signals,
clock means adapted to provide clock pulses,
current means including one current determining element adapted to provide one substantially constant current and another current determining element adapted to provide another current,
a first current mode switch having an input connected to receive said digital signals, said current mode switch further having first and second current paths each connected to receive said first constant current, said second current path being connected at a first circuit point to said negative resistance device,
a charge storage device connected between said first circuit point and said current determining element, and
control means responsive to said clock pulses to provide different series paths for current flow for different levels of the digital signals, one series path including said negative resistance device, said second current path and said one current element and the other series path including said negative resistance device, said charge storage device and said other current element, whereby current flow in said first and second series paths places said negative resistance device in first and second stable states, respectively.

5. The invention according to claim 4:
wherein said current means includes a further current determining element adapted to provide a further substantially constant current,
wherein said control means includes a second current mode switch having an input connected to receive said clock pulses, said second current mode switch further having first and second current paths to which said further substantially constant current is steered in the presence and absence of said clock pulses, respectively, and
wherein said control means further includes means responsive to the presence of current flow in the second current path of said second current mode switch to inhibit the steering of said one constant current to the second current path of said first current mode switch.

6. A digital circuit according to claim 5
wherein each of said first and second current mode switches includes first and second transistors, each having an emitter and collector electrode to define said first and second current paths,
wherein the emitter electrodes of said first switch are connected in common to said one current element and the emitter electrodes of said second switch are connected in common to said further current element, and
wherein said negative resistance device is a tunnel diode.

References Cited

UNITED STATES PATENTS

| | | | |
|---|---|---|---|
| 3,132,260 | 5/1964 | Gunderson et al. | 307—88.5 |
| 3,177,374 | 4/1965 | Simonian et al. | 307—88.5 |
| 3,201,608 | 8/1965 | Chung et al. | 307—88.5 |

ARTHUR GAUSS, *Primary Examiner.*

JOHN ZAZWORSKY, *Assistant Examiner.*